US012560933B2

(12) United States Patent
Ai et al.

(10) Patent No.: US 12,560,933 B2
(45) Date of Patent: Feb. 24, 2026

(54) WAREHOUSING ROBOT CONTROL METHOD, APPARATUS, DEVICE, AND STORAGE MEDIUM

(71) Applicant: HAI ROBOTICS CO., LTD., Guangdong (CN)

(72) Inventors: Xin Ai, Guangdong (CN); Hu Zhao, Guangdong (CN); Runfang Yu, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 192 days.

(21) Appl. No.: 18/337,595

(22) Filed: Jun. 20, 2023

(65) Prior Publication Data

US 2023/0333562 A1       Oct. 19, 2023

Related U.S. Application Data

(63) Continuation of application No. PCT/CN2021/134812, filed on Dec. 1, 2021.

(30) Foreign Application Priority Data

Dec. 23, 2020       (CN) ......................... 202011540319.5

(51) Int. Cl.
  *G05D 1/02*       (2020.01)
  *G05D 1/00*       (2006.01)
(52) U.S. Cl.
  CPC ......... *G05D 1/0214* (2013.01); *G05D 1/0289* (2013.01)

(58) Field of Classification Search
  CPC .............. G05D 1/0214; G05D 1/0289; G05B 19/41865; G05B 2219/31005;
  (Continued)

(56) References Cited

U.S. PATENT DOCUMENTS

2006/0095160 A1* 5/2006 Orita .................... G05D 1/0274
                                                             700/248
2015/0260535 A1* 9/2015 Yoshida ............... G05D 1/0297
                                                             701/25
(Continued)

FOREIGN PATENT DOCUMENTS

CN           101174318 A      5/2008
CN           204166387 U      2/2015
          (Continued)

OTHER PUBLICATIONS

International Search Report mailed Jan. 30, 2022; PCT/CN2021/134812 with English Translation.
(Continued)

*Primary Examiner* — Rodney A Butler
(74) *Attorney, Agent, or Firm* — Ladas & Parry, LLP

(57)       ABSTRACT

A warehousing robot control method includes: acquiring the number of a warehousing robot in a preset area of a workstation, and sending an avoidance instruction to a warehousing robot that meets an avoidance condition when the number of the robot in the preset area meets a throttling condition. The avoidance instruction is used for indicating an operation of the warehousing robot stopping entering the preset area.

18 Claims, 5 Drawing Sheets

(58) Field of Classification Search
CPC ... G05B 19/41895; Y02P 90/02; B65G 1/137;
B65G 1/1371; B65G 1/04; B65G 1/1373
See application file for complete search history.

(56) References Cited

U.S. PATENT DOCUMENTS

| | | | |
|---|---|---|---|
| 2018/0043533 | A1 | 2/2018 | Johnson |
| 2019/0385463 | A1* | 12/2019 | Cantrell ............... H04W 4/021 |

FOREIGN PATENT DOCUMENTS

| | | |
|---|---|---|
| CN | 106516530 A | 3/2017 |
| CN | 106843238 A | 6/2017 |
| CN | 108241372 A | 7/2018 |
| CN | 108592920 A | 9/2018 |
| CN | 108806322 A | 11/2018 |
| CN | 108945920 A | 12/2018 |
| CN | 109048909 A | 12/2018 |
| CN | 109048910 A | 12/2018 |
| CN | 109592280 A | 4/2019 |
| CN | 109656243 A | 4/2019 |
| CN | 110059926 A | 7/2019 |
| CN | 110239868 A | 9/2019 |
| CN | 110348749 A | 10/2019 |
| CN | 110436108 A | 11/2019 |
| CN | 111275370 A | 6/2020 |
| CN | 106516530 B | 7/2020 |
| CN | 107045343 B | 7/2020 |
| CN | 111367299 A | 7/2020 |
| CN | 112015190 A | 12/2020 |
| CN | 112085453 A | 12/2020 |
| CN | 112644946 A | 4/2021 |
| JP | 2001331582 A | 11/2001 |
| JP | 2009087138 A | 4/2009 |
| JP | 201176168 A | 4/2011 |
| JP | 2012521338 A | 9/2012 |
| WO | WO2008007789 A1 | 1/2008 |
| WO | WO2016076980 A1 | 5/2016 |
| WO | WO2019238865 A1 | 12/2019 |

OTHER PUBLICATIONS

Cited in the search/examination report of EP21909086.7, dated Feb. 15, 2024.
First Office Action of JP2023-533364, dated Jul. 30, 2024.
Notice of Allowance of TW112148149, dated Feb. 21, 2025.

* cited by examiner

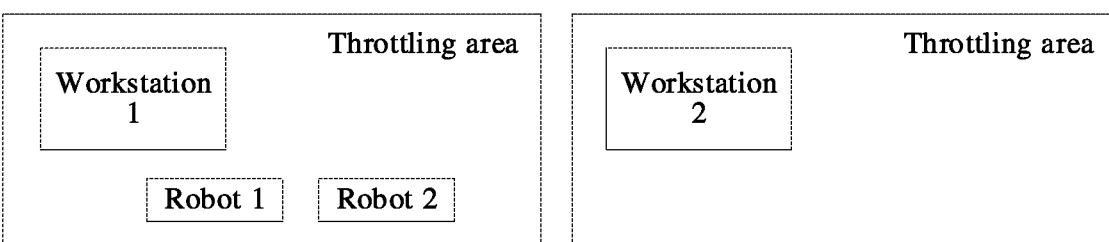

FIG. 2

Scheduling server                           Warehousing robot

S201 the number of a robot in a preset area of a workstation is acquired by a scheduling server

S202 whether the number of the robot in the preset area meets a throttling condition is determined according to the number of the robot in the preset area Yes    S203 the scheduling server determines a warehousing robot that meets an avoidance condition is determined when the number of the robot in the preset area meets the throttling condition

S204 an avoidance instruction is sent to the warehousing robot that meets the avoidance condition by the scheduling server

S205 when the warehousing robot receives the avoidance instruction, the warehousing robot gets into an avoidance state and stops moving toward a preset area of a workstation allocated to the warehousing robot

S206 the warehousing robot in the avoidance state is scheduled to enter the preset area when the number of the robot in the preset area does not meet the throttling condition

S207 the warehousing robot gets out of the avoidance state and moves toward the preset area in response to a scheduling instruction

FIG. 3

Scheduling server | Warehousing robot

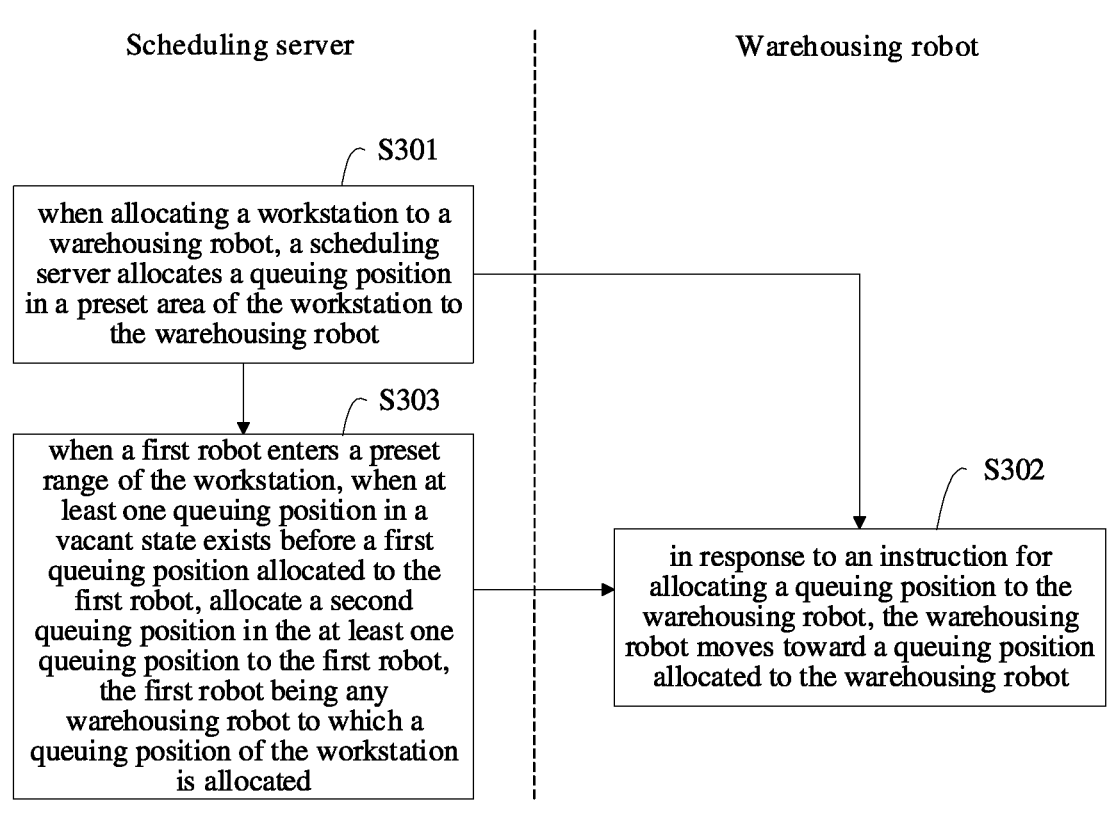

S301 when allocating a workstation to a warehousing robot, a scheduling server allocates a queuing position in a preset area of the workstation to the warehousing robot

S303 when a first robot enters a preset range of the workstation, when at least one queuing position in a vacant state exists before a first queuing position allocated to the first robot, allocate a second queuing position in the at least one queuing position to the first robot, the first robot being any warehousing robot to which a queuing position of the workstation is allocated

S302 in response to an instruction for allocating a queuing position to the warehousing robot, the warehousing robot moves toward a queuing position allocated to the warehousing robot

FIG. 4

Throttling area that constitutes the workstation 1

Workstation 1

Queuing position 1 | Queuing position 2 | Queuing position N

Throttling area that constitutes the workstation 2

Workstation 2

Queuing position 1 | Queuing position 2 | Queuing position N

FIG. 5

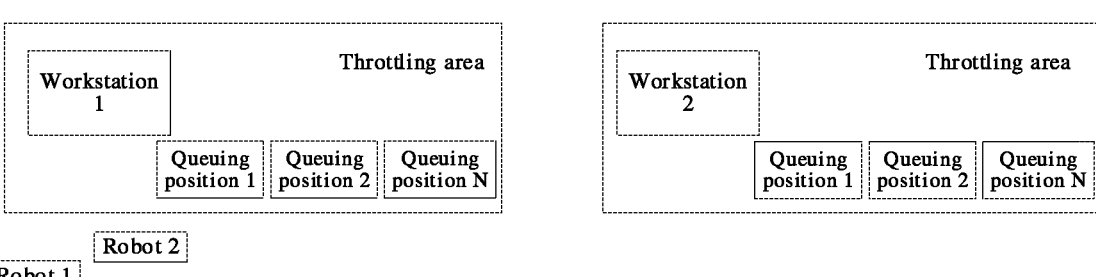

Throttling area

Workstation 1

Queuing position 1 | Queuing position 2 | Queuing position N

Robot 2

Robot 1

Throttling area

Workstation 2

Queuing position 1 | Queuing position 2 | Queuing position N

FIG. 6

WAREHOUSING ROBOT CONTROL METHOD, APPARATUS, DEVICE, AND STORAGE MEDIUM

CROSS-REFERENCE TO RELATED APPLICATIONS

The present disclosure is a continuation of International Patent Application No. PCT/CN2021/134812 filed on Dec. 1, 2021, which claims priority to Chinese Patent Application No. 202011540319.5, filed with the China National Intellectual Property Administration on Dec. 23, 2020 and entitled "WAREHOUSING ROBOT CONTROL METHOD, APPARATUS, DEVICE, AND STORAGE MEDIUM", which are incorporated herein by reference in their entirety.

TECHNICAL FIELD

Embodiments of the present disclosure relate to the field of warehousing logistics technologies, and in particular, to a warehousing robot control method and apparatus, a device, and a storage medium.

BACKGROUND

With the increasing development of artificial intelligence and online shopping, there is a huge development opportunity for the intelligence of warehousing, sorting, and logistics of goods. In recent years, an intelligent warehousing system for carrying goods based on a warehousing robot has become increasingly mature.

In the related art, a warehousing robot may carry goods according to a predetermined route in a warehouse that stores goods, for example, carrying goods from a shelf to a workstation so that a person performs corresponding sorting according to a goods order, or carrying goods from a workstation to a storage position on a shelf to complete warehousing of the goods. When a plurality of warehousing robots stay at a workstation and wait to carry goods, all the plurality of warehousing robots are crowded near the workstation, which is likely to cause congestion and lead to low goods pick-and-place efficiency.

SUMMARY

Embodiments of the present disclosure provide a warehousing robot control method and apparatus, a device, and a storage medium, to resolve a problem that congestion is likely to occur near a workstation and lead to low goods pick-and-place efficiency.

According to a first aspect, an embodiment of the present disclosure provides a warehousing robot control method, applied to a scheduling server of an intelligent warehousing system, the method including:

acquiring the number of a robot in a preset area of a workstation; and sending an avoidance instruction to a warehousing robot that meets an avoidance condition when the number of the robot in the preset area meets a throttling condition, the avoidance instruction being used for indicating an operation of the warehousing robot stopping entering the preset area.

In an optional implementation, that the number of the robot in the preset area meets a throttling condition includes: the number of the robot in the preset area is greater than a first threshold.

In an optional implementation, the preset area includes at least one queuing position, and that the number of the robot in the preset area meets a throttling condition includes: the number of the robot in the preset area is equal to the number of the at least one queuing position in the preset area.

In an optional implementation, the preset area includes at least one queuing position, and that the number of the robot in the preset area meets a throttling condition includes: each of the at least one queuing position is occupied by a robot; or each of the at least one queuing position is occupied by a robot, and the number of the robot in the preset area is greater than a second threshold, the second threshold being greater than the number of the at least one queuing position.

In an optional implementation, the sending an avoidance instruction to a warehousing robot that meets an avoidance condition includes: sending the avoidance instruction to a warehousing robot to which the workstation has been allocated and that has not entered the preset area; or sending the avoidance instruction to a warehousing robot to which the workstation has been allocated and that has entered a first area and has not entered the preset area, the preset area being a part of the first area.

In an optional implementation, the avoidance instruction is configured to instruct the warehousing robot to get into an avoidance state and stand by in situ; or the avoidance instruction is configured to instruct the warehousing robot to get into an avoidance state, move to a waiting area, and then stand by.

In an optional implementation, the waiting area is an area other than the preset area; or the waiting area is an area other than the preset area and within a preset distance range of the workstation; or the waiting area is a specified avoidance area in an area other than a preset area of each workstation.

In an optional implementation, after the sending an avoidance instruction to a warehousing robot that meets an avoidance condition, the method further includes: detecting whether a warehousing robot in an avoidance state is located in the waiting area; and sending, to a warehousing robot that is located out of the waiting area and that is in an avoidance state, an indication for entering the waiting area.

In an optional implementation, the avoidance instruction is further configured to set a priority of the warehousing robot that meets the avoidance condition to the lowest level.

In an optional implementation, the method further includes: allocating a queuing position in the preset area to the warehousing robot during allocation of the workstation to the warehousing robot.

In an optional implementation, the method further includes: when a first robot enters a preset range of the workstation, if at least one queuing position in a vacant state exists before a first queuing position allocated to the first robot, allocating a second queuing position in the at least one queuing position to the first robot, the first robot being any warehousing robot to which a queuing position of the workstation is allocated.

In an optional implementation, the second queuing position is the frontmost queuing position of the at least one queuing position in the vacant state.

In an optional implementation, after the allocating a second queuing position in the at least one queuing position to the first robot, the method further includes: updating a queuing position of at least one second robot, each of the at least one second robot being a robot to which a queuing position of the workstation has been allocated and that has not arrived at a corresponding queuing position.

In an optional implementation, the method further includes: determining a third robot corresponding to the second queuing position; and the updating a queuing position of at least one second robot includes: allocating the first queuing position to the third robot.

In an optional implementation, the updating a queuing position of at least one second robot includes: re-allocating a queuing position in a vacant state to each second robot according to a queuing position in a vacant state in the preset area, an order of a queuing position corresponding to the at least one second robot after the re-allocation being the same as an order of a queuing position corresponding to the at least one second robot before the re-allocation.

In an optional implementation, the allocating a queuing position in the preset area to the warehousing robot includes: allocating a corresponding queuing position to the warehousing robot according to task attribute information of the warehousing robot, the task attribute information including at least one of the following: a task allocation time, a task priority, and a remaining task time.

In an optional implementation, after the sending an avoidance instruction to a warehousing robot that meets an avoidance condition when the number of the robot in the preset area meets a throttling condition, the method further includes: scheduling a warehousing robot in an avoidance state to enter the preset area if the number of the robot in the preset area does not meet the throttling condition.

In an optional implementation, the scheduling a warehousing robot in an avoidance state to enter the preset area when the number of the robot in the preset area does not meet the throttling condition includes: when a fourth robot in the preset area leaves the preset area, determining a corresponding number of a fifth robot in the avoidance state according to the number of the fourth robot, and scheduling the fifth robot to enter the preset area.

In an optional implementation, the scheduling a warehousing robot in an avoidance state to enter the preset area when the number of the robot in the preset area does not meet the throttling condition includes: when a warehousing robot in a first queuing position in the preset area leaves the first queuing position, scheduling warehousing robots in the second and later queuing positions in the preset area to move from the current queuing positions to previous queuing positions.

In an optional implementation, after the scheduling warehousing robots in the second and later queuing positions in the preset area to move from the current queuing positions to previous queuing positions, the method further includes: determining a corresponding number of a fifth robot in an avoidance state according to the queuing position currently in a vacant state in the preset area; and allocating the queuing position currently in the vacant state in the preset area to the fifth robot.

In an optional implementation, the determining a corresponding number of a fifth robot in the avoidance state includes: sorting the warehousing robot in the avoidance state; and determining, according to an order of the warehousing robot getting into the avoidance state, the corresponding number of warehousing robot in the avoidance state as the fifth robot.

In an optional implementation, the sorting the warehousing robot in the avoidance state includes: sorting the warehousing robot in the avoidance state according to task attribute information of the warehousing robot in the avoidance state, the task attribute information including at least one of the following: a task allocation time, a task priority, and a remaining task time; or sorting the warehousing robot in the avoidance state according to an order of entering the avoidance state; or sorting the warehousing robot in the avoidance state according to an order of entering a waiting area; or sorting the warehousing robot in the avoidance state according to an order of an allocated queuing position.

In an optional implementation, the warehousing robot includes a plurality of types of robots, the preset area includes at least one queue, each queue includes at least one queuing position, and during allocation of a queuing position in the preset area to the warehousing robot, a queuing position in a queue corresponding to a type of the warehousing robot is allocated to the warehousing robot according to the type of the warehousing robot. According to a second aspect, an embodiment of the present disclosure provides a warehousing robot control method, applied to a warehousing robot, the method including:

getting into an avoidance state and stopping moving toward a preset area of a workstation allocated to the warehousing robot when an avoidance instruction is received, the avoidance instruction is configured to: when the number of the robot in the preset area of the workstation meets a throttling condition, instruct a warehousing robot that meets an avoidance condition to get into the avoidance state and stop moving toward the preset area.

In an optional implementation, the method further includes: in response to an instruction for allocating a queuing position to the warehousing robot, moving toward a queuing position allocated to the warehousing robot.

In an optional implementation, the getting into an avoidance state and stopping moving toward a preset area of a workstation allocated to the warehousing robot if an avoidance instruction is received includes: entering an avoidance state and standing by in situ when an avoidance instruction is received; or getting into the avoidance state, moving to a waiting area, and then standing by when the avoidance instruction is received.

In an optional implementation, after the getting into an avoidance state and stopping moving toward a preset area of a workstation allocated to the warehousing robot when an avoidance instruction is received, the method further includes: getting out of the avoidance state and moving toward the preset area in response to a scheduling instruction.

According to a third aspect, an embodiment of the present disclosure provides a warehousing robot control apparatus, applied to a scheduling server of an intelligent warehousing system, the apparatus including:

a count acquisition module, configured to acquire the number of a robot in a preset area of a workstation; and a throttling control module, configured to send an avoidance instruction to a warehousing robot that meets an avoidance condition when the number of the robot in the preset area meets a throttling condition, the avoidance instruction being used for indicating an operation of the warehousing robot stopping entering the preset area.

According to a fourth aspect, an embodiment of the present disclosure provides a warehousing robot control apparatus, applied to a warehousing robot, the apparatus including:

a control module, configured to get into an avoidance state and stop moving toward a preset area of a workstation allocated to the warehousing robot when an avoidance instruction is received, the avoidance instruction being configured to: when the number of the robot in the preset area of the workstation meets a throttling condition, instruct a warehousing robot that meets an avoidance condition to get into the avoidance state and stop moving toward the preset area.

According to a fifth aspect, an embodiment of the present disclosure provides a scheduling server, including:

a processor, a memory, and a computer program stored in the memory and capable of running on the processor, the method according to the first aspect being implemented when the processor runs the computer program.

According to a sixth aspect, an embodiment of the present disclosure provides a warehousing robot, including:

a processor, a memory, and a computer program stored in the memory and capable of running on the processor, when running the computer program, the processor is configured to implement the method according to the second aspect.

According to a seventh aspect, an embodiment of the present disclosure provides a computer-readable storage medium, the computer-readable storage medium storing a computer program, and when running the computer program, the processor is configured to implement the method according to any one of the foregoing implementations.

In the warehousing robot control method and apparatus, the device, and the storage medium provided in the embodiments of the present disclosure, a preset area for throttling control is arranged near a workstation, and a throttling condition is set. When the number of the robot in the preset area meets the throttling condition, an avoidance instruction is sent to a warehousing robot that meets an avoidance condition, the avoidance instruction being used for indicating an operation of the warehousing robot stopping entering the preset area. If a warehousing robot receives an avoidance instruction, the warehousing robot enters an avoidance state and stops moving toward a preset area of a workstation allocated to the warehousing robot. This can reduce the number of warehousing robots that wait near a workstation, thereby avoiding congestion near the workstation, and improving goods pick-and-place efficiency.

BRIEF DESCRIPTION OF THE DRAWINGS

FIG. 2 is a schematic diagram of a preset area according to Embodiment 2 of the present disclosure;

FIG. 3 is a flowchart of a warehousing robot control method according to Embodiment 2 of the present disclosure;

FIG. 4 is a flowchart of a warehousing robot control method according to Embodiment 3 of the present disclosure;

FIG. 5 is a schematic diagram of a queuing position and a preset area according to Embodiment 3 of the present disclosure;

FIG. 6 is a schematic diagram of another queuing position and preset area according to Embodiment 3 of the present disclosure;

Figure 1:
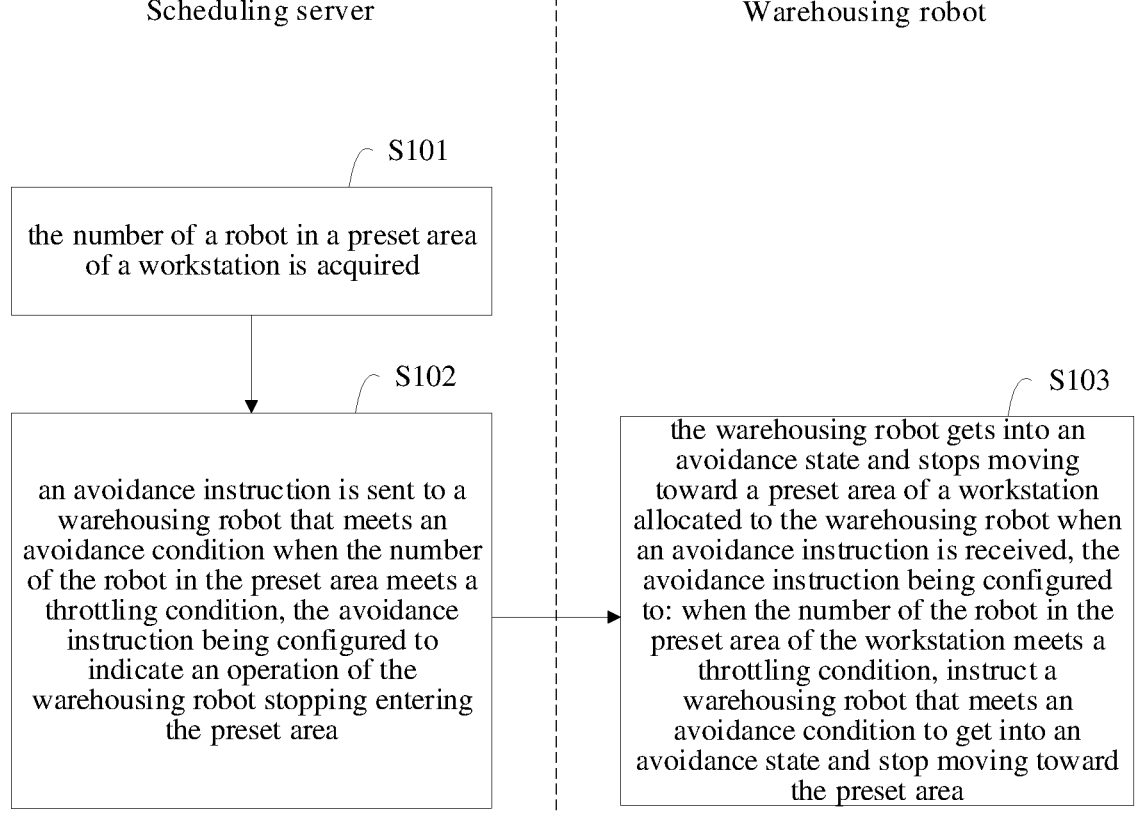
FIG. 1 is a flowchart of a warehousing robot control method according to Embodiment 1 of the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, they are merely examples of apparatuses and methods consistent with some aspects of the present disclosure as detailed in the appended claims.

First, nouns involved in the embodiments of the present disclosure are explained:

Workstation: a position for sorting goods or warehousing goods containers.

Putting in storage: a goods container in which goods are stored is placed by a warehousing robot from a workstation to a corresponding storage position.

Goods sorting: refers to a process of picking out goods corresponding to an order from a warehouse or another suitable type of goods storage place and completing packing of the goods to form a final order package for delivery. In a goods sorting process, goods pick-and-place efficiency is crucial to sorting efficiency. The goods pick-and-place efficiency may be determined by a pick-and-place count of order goods processed in a unit time. The more order goods processed in a unit time, the higher the goods pick-and-place efficiency.

In addition, the terms "first" and "second" are used for descriptive purposes only and are not to be construed as indicating or implying relative importance or implicitly indicating the number of technical features indicated. In the descriptions of the following embodiments, unless otherwise explicitly specified, "a plurality of" means two or more than two.

The embodiments of the present disclosure are specifically applied to an intelligent warehousing system. The intelligent warehousing system includes a warehousing robot, a scheduling server (that is, a server of a scheduling system), a warehouse, and the like. The warehouse may include a shelf for storing a goods container.

The scheduling server may be any type of electronic computing platform or device, and serves as a control core of the entire intelligent warehousing system. According to actual needs, the scheduling server may have corresponding storage space or computing capabilities to provide one or more application services or functions, for example, receiving orders to be delivered, issuing orders, or controlling the warehousing robot to perform tasks of picking or placing goods.

The warehousing robot is an automated device having a walking mechanism and capable of moving, carrying a goods container, carrying a shelf, and the like in the warehouse. For example, a goods container carrying robot, a shelf carrying robot, or an automated guided vehicle (AGV). All robots mentioned in the embodiments refer to warehousing robots.

The warehouse is an area for storing goods containers. To facilitate management, a plurality of shelves may be arranged in the warehouse, and a plurality of identical or different goods containers are placed on each shelf according to a specific placement rule.

When goods need to be picked or placed, the scheduling server allocates, through scheduling, a carrying task and a corresponding workstation to the warehousing robot, and the warehousing robot needs to go to the corresponding workstation to pick or place goods. For example, the warehousing robot carries goods from a shelf to a workstation so that a person performs a corresponding sorting operation according to a goods order, or the warehousing robot carries goods from a workstation to a storage position on a shelf to complete an operation of putting the goods in storage. When a plurality of warehousing robots stay at a workstation and wait to carry goods, all the plurality of warehousing robots are crowded near the workstation, which is likely to cause congestion and lead to low goods pick-and-place efficiency.

A warehousing robot control method and an apparatus, a device, and a storage medium provided in the embodiments of the present disclosure are intended to resolve the foregoing technical problems.

The following describes the technical solutions of the present disclosure and how to resolve the foregoing technical problems according to the technical solutions of this application in detail by using specific embodiments. The following several specific embodiments may be combined with each other, and the same or similar concepts or processes may not be described repeatedly in some embodiments. The embodiments of the present disclosure are described below with reference to the accompanying drawings.

Embodiment 1

FIG. 1 is a flowchart of a warehousing robot control method according to Embodiment 1 of the present disclosure. As shown in FIG. 1, specific operations of the method are as follows:

In block S101: the number of a robot in a preset area of a workstation is acquired.

In practical application, a plurality of workstations are usually arranged in an intelligent warehousing system. In this embodiment, a preset area is arranged near each workstation. For example, as shown in FIG. 2, two workstations in an intelligent warehousing system are used as examples, and corresponding preset areas are respectively arranged around a workstation 1 and a workstation 2.

A corresponding throttling condition is set for the preset area of the workstation. When the number of the robot in the preset area meets a throttling condition, other warehousing robots are not allowed to continue to enter the preset area. In this way, the number of the robot in the preset area near the workstation is controlled, so that the robots can perform avoidance as much as possible within a limited range, thereby minimizing congestion of the robots.

Throttling conditions corresponding to preset areas of different workstations may be different.

A specific position of a preset area of each workstation and a corresponding throttling condition may be set and adjusted according to actual needs of the intelligent warehousing system. This is not specifically limited herein in this embodiment. For example, a throttling condition corresponding to a preset area may be set to be that the number of the robot in the preset area reaches a preset upper threshold.

In this embodiment, a scheduling server may acquire the number of a warehousing robot in a preset area of each workstation in real time.

For example, the scheduling server may acquire a real-time position of each warehousing robot, and determine the number of warehousing robots in a preset area of each workstation according to the real-time position of each warehousing robot and a position of the preset area of each workstation.

In block S102: an avoidance instruction is sent to a warehousing robot that meets an avoidance condition when the number of the robot in the preset area meets a throttling condition, the avoidance instruction being configured to indicate an operation of the warehousing robot stopping entering the preset area.

When the number of the robot in the preset area meets the throttling condition, first, the warehousing robot that meets the avoidance condition is determined, and then the avoidance instruction is sent to the warehousing robot that meets the avoidance condition, to indicate the operation of the warehousing robot that meets the avoidance condition stopping entering the preset area.

For any workstation, a warehousing robot to which the workstation is allocated moves to the workstation to complete a task allocated to the warehousing robot. The warehousing robot enters a preset area of the workstation before arriving at the workstation.

For a preset area of any workstation, the scheduling server determines, according to the number of the robot in the preset area that is acquired in real time and a throttling condition corresponding to the preset area, whether the number of warehousing robots in the preset area meets the corresponding throttling condition.

In a process in which any warehousing robot moves toward a workstation, before the warehousing robot enters a preset area of the workstation, when the number of warehousing robots in the preset area has met a corresponding throttling condition, the warehousing robot is prohibited from continuing to enter the preset area. In this case, the scheduling server may send the avoidance instruction to the warehousing robot, to control an operation of the warehousing robot stopping entering the preset area.

In block S103: the warehousing robot gets into an avoidance state and stops moving toward a preset area of a workstation allocated to the warehousing robot when an avoidance instruction is received, the avoidance instruction being configured to: when the number of the robot in the preset area of the workstation meets a throttling condition, instruct a warehousing robot that meets an avoidance condition to get into an avoidance state and stop moving toward the preset area.

In a process in which a warehousing robot moves toward a workstation, if the warehousing robot receives an avoidance instruction before entering a preset area of the workstation, the warehousing robot gets into the avoidance state and stops moving toward the preset area of the workstation allocated to the warehousing robot.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to get into an avoidance state and stop moving toward a preset area of a workstation allocated to the warehousing robot. This can reduce the number of warehousing robots that wait near a workstation, thereby avoiding congestion near the worksta-tion, and improving goods pick-and-place efficiency.

Embodiment 2

FIG. 3 is a flowchart of a warehousing robot control method according to Embodiment 2 of the present disclo-sure. Based on Embodiment 1, in this embodiment, after the sending an avoidance instruction to a warehousing robot that meets an avoidance condition when the number of the robot in the preset area meets a throttling condition, the method further includes: scheduling a warehousing robot in an avoidance state to enter the preset area if the number of the robot in the preset area does not meet the throttling condi-tion.

As shown in FIG. 3, specific operations of the method are as follows:

In block S201: the number of a robot in a preset area of a workstation is acquired by a scheduling server.

An implementation of this operation is the same as that of operation in block S101. Details are not described herein again.

In block S202: whether the number of the robot in the preset area meets a throttling condition is determined according to the number of the robot in the preset area.

In an optional implementation of this embodiment, that the number of the robot in the preset area meets a throttling condition includes: the number of the robot in the preset area is greater than a first threshold.

The first threshold may be a preset upper threshold corresponding to the preset area. The upper threshold of the preset area may be the maximum number of warehousing robots allowed to enter the preset area at the same time, and may be set and adjusted according to a requirement of an application scenario. This is not specifically limited herein.

In this implementation, the number of the robot in the preset area is limited, so that throttling control is imple-mented on robots in the preset area near the workstation, to reduce the number of the robot that wait near the worksta-tion.

In another optional implementation of this embodiment, the preset area includes at least one queuing position, that is, the at least one queuing position constitutes the preset area. That the number of the robot in the preset area meets a throttling condition includes: the number of the robot in the preset area is equal to the number of the at least one queuing position in the preset area.

In this implementation, a plurality of queuing positions (constituting the preset area) are arranged around the work-station, and each queuing position is allowed to be used only by one warehousing robot at the same time. Limited queuing positions are arranged to perform throttling control on warehousing robots around the workstation, so as to reduce the number of the robot that wait near the workstation.

In another optional implementation of this embodiment, the preset area includes at least one queuing position, and the preset area further includes an area other than all queuing positions.

Optionally, the preset area includes at least one queuing position, and that the number of the robot in the preset area meets a throttling condition may be: each of the at least one queuing position is occupied by a robot.

Optionally, the preset area includes at least one queuing position, and that the number of the robot in the preset area meets a throttling condition may be alternatively: each of the at least one queuing position is occupied by a robot, and the number of the robot in the preset area is greater than a second threshold. The second threshold is greater than the number of the at least one queuing position. The second threshold may be set and adjusted according to a require-ment of an actual application scenario. This is not specifi-cally limited herein in this embodiment.

In block S203: the scheduling server determines a ware-housing robot that meets an avoidance condition is deter-mined when the number of the robot in the preset area meets the throttling condition.

Optionally, the warehousing robot that meets the avoid-ance condition may include: a warehousing robot to which the workstation has been allocated and that has not entered the preset area.

When the number of the robot in the preset area meets the throttling condition, for warehousing robots to which the workstation has been allocated and that have not entered the preset area, some warehousing robots may be far away from the preset area of the workstation. When the robots far away from the preset area move to the preset area normally, some robots in the preset area may have completed operations at the workstation and left the preset area. These warehousing robots should be temporarily allowed to continue to move toward the workstation. Optionally, an area larger than the preset area may be arranged around the workstation, and the warehousing robot that meets the avoidance condition may include: a warehousing robot to which the workstation has been allocated and that has entered a first area and has not entered the preset area. The preset area is a part of the first area.

A size, a shape, and a specific position of the first area may be set and adjusted according to a requirement of an actual application scenario. This is not specifically limited herein.

In block S204: an avoidance instruction is sent to the warehousing robot that meets the avoidance condition by the scheduling server.

After the warehousing robot that meets the avoidance condition is determined, the avoidance instruction is sent to the warehousing robot that meets the avoidance condition.

The avoidance instruction is configured to indicate an operation of the warehousing robot stopping entering the preset area.

Optionally, the avoidance instruction is configured to instruct the warehousing robot to get into an avoidance state and stand by in situ, to stop entering the preset area.

Optionally, a waiting area may be arranged, and the avoidance instruction is configured to instruct the warehous-ing robot to get into an avoidance state, move to the waiting area, and then stand by, to stop entering the preset area.

The waiting area is an area other than the preset area, and is an area for the warehousing robot that receives the avoidance instruction and that gets into the avoidance state to enter and stay.

To prevent congestion near the workstation, the waiting area may be arranged. When the number of the robot in the preset area of the workstation meets the throttling condition, the warehousing robot that meets the avoidance condition gets into the avoidance state, moves to the waiting area for standby, and waits for a warehousing robot in front of the workstation to process an order. When the warehousing robot in front of the workstation completes the order and leaves the preset area and the number of the robot in the preset area does not meet the throttling condition, the warehousing robot then moves toward the workstation.

Optionally, all areas other than the preset area may be used as waiting areas. In this way, after receiving the avoidance instruction, the warehousing robot that meets the avoidance condition may directly stand by in situ and enter the avoidance state.

Optionally, an area other than the preset area within a preset distance range of the workstation may be arranged as a waiting area. In this way, after receiving the avoidance instruction, the warehousing robot that meets the avoidance condition may move to the waiting area close to the workstation for avoidance. The preset distance range may be set and adjusted according to an actual application scenario. This is not specifically limited herein.

Optionally, a specified avoidance area in an area other than a preset area of each workstation may be alternatively arranged as a waiting area. For example, a specified avoidance area may be arranged in an area with small traffic of robots. The specified avoidance area may be arranged and adjusted to an actual application scenario. This is not specifically limited herein.

Optionally, during arrangement of a waiting area position, a range may be directly specified as a waiting area; or a range may be specified as an area that needs to be avoided, and an area other than the area that needs to be avoided is used as a waiting area. The area that needs to be avoided may include a throttling area, an arterial road area, an area near a workstation, an area near a shelf, or a critical area that another warehousing robot needs to pass when performing a task.

A position of a waiting area arranged in an intelligent warehousing system may be arranged and adjusted according to a requirement of an actual application scenario. This is not specifically limited herein in this embodiment.

In addition, the number of waiting areas arranged in the intelligent warehousing system may also be set and adjusted according to a requirement of an actual application scenario. This is not specifically limited herein in this embodiment.

Optionally, a throttling area of each workstation may correspond to one waiting area, and a warehousing robot can enter only a waiting area of a workstation allocated to the warehousing robot.

Optionally, a plurality of waiting areas are arranged in the intelligent warehousing system, and a warehousing robot may randomly enter one of the waiting areas, or enter a waiting area closest to a current position of the warehousing robot.

In an optional implementation of this embodiment, the avoidance instruction is further configured to set a priority of the warehousing robot that meets the avoidance condition to the lowest level. When two warehousing robots with different priorities encounter and one of the warehousing robots needs to perform avoidance, a warehousing robot with a lower priority avoids a warehousing robot with a higher priority. Therefore, when receiving an avoidance instruction, a warehousing robot first gets into an avoidance state. Regardless of whether the warehousing robot stands by in situ or is in a process of moving to a waiting area, the warehousing robot is in the avoidance state. If the warehousing robot in the avoidance state encounters another warehousing robot that is not in the avoidance state (for example, a warehousing robot that has completed an operation at a workstation and that is carrying goods to the warehouse), the warehousing robot in the avoidance state should actively give way to the warehousing robot that is not in the avoidance state.

In block S205: when the warehousing robot receives the avoidance instruction, the warehousing robot gets into an avoidance state and stops moving toward a preset area of a workstation allocated to the warehousing robot.

In this operation, the warehousing robot may get into the avoidance state and stand by in situ according to indication information included in the received avoidance instruction; or get into the avoidance state, move to a waiting area, and then stand by according to indication information included in the received avoidance instruction.

In this embodiment, when a waiting area is arranged, the avoidance instruction is configured to instruct the warehousing robot to get into the avoidance state, move to the waiting area, and then stand by. In this case, after sending the avoidance instruction to the warehousing robot that meets the avoidance condition, the scheduling server may further detect whether the warehousing robot in the avoidance state is located in the waiting area, and send, to a warehousing robot that is located out of the waiting area and that is in the avoidance state, an indication for entering the waiting area. This can ensure that all warehousing robots that meet the avoidance condition get into the waiting area for standby as soon as possible.

A function of the waiting area is as follows: When a warehousing robot is in the avoidance state, the warehousing robot should not block another warehousing robot, and should not wait near a workstation (or wait in an area that needs to be avoided, for example, an arterial road) either. Therefore, when a warehousing robot gets into the avoidance state, it is detected whether the robot is in the waiting area. If the robot is not in the waiting area, the robot automatically finds a path to go to the waiting area and waits in the waiting area.

In block S206: the warehousing robot in the avoidance state is scheduled to enter the preset area when the number of the robot in the preset area does not meet the throttling condition.

In an optional implementation, when a fourth robot in the preset area leaves the preset area, a corresponding number of a fifth robot in the avoidance state are determined according to the number of the fourth robot, and the fifth robot is scheduled to enter the preset area.

In this embodiment, when a warehousing robot leaves the preset area and the number of the robot in the preset area does not meet the corresponding throttling condition, the scheduling server schedules one or more warehousing robots in the waiting area to enter the preset area.

The fourth robot refers to a warehousing robot that currently leaves the preset area. There may be one or more fourth robots. The fifth robot refers to a warehousing robot scheduled to enter the preset area when the number of the robot in the preset area does not meet the corresponding throttling condition. The number of the fifth robot may be determined according to the number of the fourth robot that leave the preset area (that is, the number of a warehousing robot that can further enter the preset area), and cannot exceed the number of the fourth robot.

In another optional implementation, when a warehousing robot in the first queuing position in the preset area leaves the first queuing position, warehousing robots in the second and later queuing positions in the preset area are scheduled to move from the current queuing positions to previous queuing positions. In this way, at least one queuing position at the end of a queue in the preset area is vacant. The scheduling server determines a corresponding number of the fifth robot in the avoidance state according to a queuing position currently in a vacant state in the preset area; and allocates the queuing position currently in the vacant state in the preset area to the fifth robot.

In any one of the foregoing optional implementations of this operation, the determining a corresponding number of the fifth robot in the avoidance state may be specifically implemented in the following manner:

sorting the warehousing robot in the avoidance state; and determining, according to an order of the warehousing robot getting into the avoidance state, the corresponding number of the warehousing robot in the avoidance state as the fifth robot.

Further, the warehousing robot in the avoidance state may be sorted according to a sorting policy.

An optional sorting policy is as follows: The warehousing robot in the avoidance state is sorted according to task attribute information of the warehousing robot in the avoidance state. The task attribute information includes at least one of the following: a task allocation time, a task priority, and a remaining task time.

Another optional sorting policy is as follows: The warehousing robot in the avoidance state is sorted according to an order of entering the avoidance state.

Another optional sorting policy is as follows: If a waiting area is arranged, the warehousing robot in the avoidance state may be alternatively sorted according to an order of entering the waiting area.

Another optional sorting policy is as follows: If the preset area includes a plurality of queuing positions, a queuing position is further allocated to a warehousing robot while a workstation is allocated to the warehousing robot. In this case, the warehousing robot in the avoidance state may be sorted according to an order of an allocated queuing position.

In block S207: the warehousing robot gets out of the avoidance state and moves toward the preset area in response to a scheduling instruction.

In this embodiment, when the scheduling server schedules the warehousing robot in the avoidance state to enter the preset area, the scheduling server may implement this by sending the scheduling instruction to the warehousing robot.

The scheduling instruction is configured to control the warehousing robot to get out of the avoidance state and move from a current position to the preset area.

When receiving the scheduling instruction, the warehousing robot moves from the current position to the workstation allocated to the warehousing robot, enters a preset area of the workstation, and completes a task allocated to the warehousing robot at the workstation. In an optional implementation of this embodiment, the warehousing robot may include a plurality of different types of robots, for example, a goods container carrying robot or a shelf carrying robot.

Optionally, for each workstation, different preset areas may be arranged for different types of warehousing robots, and throttling control is independently performed on each type of warehousing robot.

Optionally, only one preset area is arranged for each workstation, and throttling control is performed on different types of warehousing robots in a unified manner, without distinguishing.

Optionally, only one preset area is arranged for each workstation, the preset area includes at least one queue, and each queue includes at least one queuing position. During allocation of a queuing position in the preset area to a warehousing robot, a queuing position in a queue corresponding to a type of the warehousing robot is allocated to the warehousing robot according to the type of the warehousing robot. A corresponding queue may be arranged for each type of warehousing robot. Alternatively, a shared queue may be allocated to a plurality of different types of warehousing robots. This is not specifically limited herein in this embodiment.

In this way, a queuing mechanism of the workstation is very flexible. A plurality of different types of robots can queue together, or each type of robot can queue independently. A flexible queuing policy may be selected according to different specific application scenarios.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to enter an avoidance state and stop moving toward a preset area of a workstation allocated to the warehousing robot; or if the number of the robot in the preset area does not meet the throttling condition, a warehousing robot in an avoidance state is scheduled to enter the preset area. This can reduce the number of warehousing robots that wait near a workstation, thereby avoiding congestion near the workstation. In addition, this can improve working efficiency of a warehousing robot, thereby improving goods pick-and-place efficiency.

Embodiment 3

FIG. 4 is a flowchart of a warehousing robot control method according to Embodiment 3 of the present disclosure. Based on Embodiment 1 or Embodiment 2, in this embodiment, a preset area includes a plurality of queuing positions in order. When allocating a workstation to a warehousing robot, a scheduling server may allocate a queuing position in a preset area of the workstation to the warehousing robot.

In an optional implementation of this embodiment, as shown in FIG. 5, a preset area of a workstation may be constituted by an area in which a plurality of queuing positions are located. The number of queuing positions included in the preset area (for example, in FIG. 5, N is used for representing the number of queuing positions in the preset area) is an upper limit value of robots that can be accommodated in the preset area. In this implementation, when the number of the robot in the preset area is equal to the number of at least one queuing position in the preset area, the number of the robot in the preset area meets a throttling condition, throttling needs to be started, and another warehousing robot enters an avoidance state and stops entering the preset area of the workstation.

In another optional implementation of this embodiment, as shown in FIG. 6, a preset area of a workstation may be a connected area around the workstation, at least one queuing position is arranged in the preset area, and the preset area further includes an area other than all queuing positions. In this implementation, when all the queuing positions in the preset area are occupied, or when all the queuing positions in the preset area are occupied by robots and the number of the robot in the preset area is greater than a second threshold, the number of the robot in the preset area meets a throttling condition, throttling is started, and another warehousing robot enters an avoidance state and stops entering the preset area of the workstation.

As shown in FIG. 4, the method further includes the following operations.

In block S301: when allocating a workstation to a warehousing robot, a scheduling server allocates a queuing position in a preset area of the workstation to the warehousing robot.

In this embodiment, when allocating a workstation to a warehousing robot, the scheduling server also allocates a queuing position in a preset area of the workstation to the warehousing robot. The warehousing robot moves toward the queuing position allocated to the warehousing robot according to the workstation and the queuing position that are allocated to the warehousing robot.

For example, the allocating a queuing position in a preset area of the workstation to the warehousing robot may be specifically implemented in the following manner:

allocating a corresponding queuing position to the warehousing robot according to task attribute information of the warehousing robot. The task attribute information includes at least one of the following: a task allocation time, a task priority, and a remaining task time.

In addition, a policy used for allocating a queuing position to a warehousing robot may be set and adjusted according to an actual application scenario. This is not specifically limited herein in this embodiment.

In block S302: in response to an instruction for allocating a queuing position to the warehousing robot, the warehousing robot moves toward a queuing position allocated to the warehousing robot.

After determining the queuing position allocated to the warehousing robot, the warehousing robot may move toward the queuing position allocated to the warehousing robot, that is, move toward the workstation allocated to the warehousing robot.

In block S303: when a first robot enters a preset range of the workstation, when at least one queuing position in a vacant state exists before a first queuing position allocated to the first robot, allocate a second queuing position in the at least one queuing position to the first robot, the first robot being any warehousing robot to which a queuing position of the workstation is allocated.

The preset range is an area that is around the workstation and that is close to the workstation. The preset range may be the preset area, or may be another area near the workstation. A specific position of the preset range around the workstation may be arranged and adjusted according to a requirement of an actual application scenario. Sizes of preset areas around different workstations may be different. This is not specifically limited herein in this embodiment.

The first queuing position is a queuing position allocated to a current warehousing robot. The second queuing position is one of the at least one queuing position in the vacant state before the first queuing position, and may be the frontmost queuing position of the at least one queuing position in the vacant state before the first queuing position.

When a warehousing robot enters the preset range around the workstation, that is, arrives near the workstation, if there is a vacant queuing position before a first queuing position allocated to the warehousing robot, the scheduling robot may schedule, according to an actually vacant queuing position before the first queuing position, the warehousing robot to enter the frontmost queuing position of the vacant queuing position, so that working efficiency of the warehousing robot can be improved.

For example, it is assumed that a queuing position 1 in a preset area of a workstation 1 is allocated to a robot 1, a queuing position 2 in the preset area of the workstation 1 is allocated to a robot 2, and the queuing position 1 is in front of the queuing position 2. If the robot 2 arrives near the workstation before the robot 1, the scheduling server may re-allocate the queuing position 1 to the robot 2, and the robot 2 moves to the queuing position 1 according to the re-allocated queuing position to wait for goods sorting. A queuing position of the robot 1 may be allocated backward according to actual arrival of the robot.

For example, when the first robot enters the preset range around the workstation, if there is at least one queuing position in a vacant state before the first queuing position allocated to the first robot, after the second queuing position in the at least one queuing position is allocated to the first robot, assuming that the second queuing position is allocated to a third robot before the re-allocation, the queuing position corresponding to the third robot is temporarily occupied after the re-allocation.

In an optional implementation, when the first robot enters the preset range of the workstation, if at least one queuing position in a vacant state exists before the first queuing position allocated to the first robot, after allocating the second queuing position in the at least one queuing position to the first robot, the scheduling server may further update a queuing position of at least one second robot. The second robot is a robot to which a queuing position of the workstation has been allocated and that has not arrived at the corresponding queuing position.

Optionally, when the first robot enters the preset range of the workstation, if at least one queuing position in a vacant state exists before the first queuing position allocated to the first robot, after the second queuing position in the at least one queuing position is allocated to the first robot, a queuing position of another warehousing robot (including the third robot) may remain unchanged. When another warehousing robot arrives at the preset range around the workstation, a queuing position in a vacant state is re-allocated to the warehousing robot according to an actual vacancy situation of each queuing position in the preset area.

Optionally, when the first robot enters the preset range of the workstation, if at least one queuing position in a vacant state exists before the first queuing position allocated to the first robot, after the second queuing position in the at least one queuing position is allocated to the first robot, a queuing position corresponding to another warehousing robot may be further adjusted.

For example, before the second queuing position is re-allocated to the first robot, the third robot to which the second queuing position is allocated is determined. After the second queuing position is re-allocated to the first robot, the original first queuing position of the first robot is allocated to the third robot.

For example, it is assumed that a queuing position 1 in a preset area of a workstation 1 is allocated to a robot 1, a queuing position 2 in the preset area of the workstation 1 is allocated to a robot 2, and the queuing position 1 is in front of the queuing position 2. If the robot 2 arrives at the preset range of the workstation before the robot 1, the scheduling server may re-allocate the queuing position 1 to the robot 2, and the robot 2 moves to the queuing position 1 according to the re-allocated queuing position to wait for goods sorting. Then the queuing position 2 is allocated to the robot 1. That is, the queuing positions of the robot 1 and the robot 2 are exchanged.

For example, after the second queuing position is allocated to the first robot, a queuing position in a vacant state is re-allocated to each second robot according to a queuing position in a vacant state in the preset area, an order of a queuing position corresponding to the at least one second robot after the re-allocation being the same as an order of a queuing position corresponding to the at least one second robot before the re-allocation. For example, a queuing position 1, a queuing position 2, and a queuing position 3 are allocated to a robot 1, a robot 2, and a robot 3 respectively, and the queuing positions are in order of the queuing position 1, the queuing position 2, and the queuing position 3 from the front to the back. Assuming that the queuing position 1, the queuing position 2, and the queuing position 3 are all vacant when the robot 3 arrives at the preset range near the workstation, the queuing position 1 is re-allocated to the robot 3, and the queuing positions of the robot 1 and the robot 2 sequentially move backward, that is, the queuing position 2 is re-allocated to the robot 1, and the queuing position 3 is re-allocated to the robot 2.

In the process of this embodiment, the method process provided in Embodiment 2 can be performed in real time. The scheduling server acquires the number of the robot in a preset area of a workstation; and sends an avoidance instruction to a warehousing robot that meets an avoidance condition when the number of the robot in the preset area meets a throttling condition, the avoidance instruction being used for indicating an operation of the warehousing robot stopping entering the preset area.

In this embodiment of the present disclosure, a plurality of queuing positions in order are arranged in a preset area. When allocating a workstation to a warehousing robot, the scheduling server may allocate a queuing position in a preset area of the workstation to the warehousing robot; and when all queuing positions in the preset area are occupied by robots, or when all queuing positions in the preset area are occupied by robots and the number of the robot in the preset area is greater than a second threshold, sends an avoidance instruction to a warehousing robot that meets an avoidance condition, so that the warehousing robot enters an avoidance state and stops moving toward a preset area of a workstation allocated to the warehousing robot. This can reduce the number of warehousing robots that wait near a workstation. In addition, a queuing order of warehousing robots in a preset area is specified, so that goods pick-and-place efficiency can be further improved, and an intelligent warehousing system is more intelligent and efficient.

Embodiment 4

Figure 7:
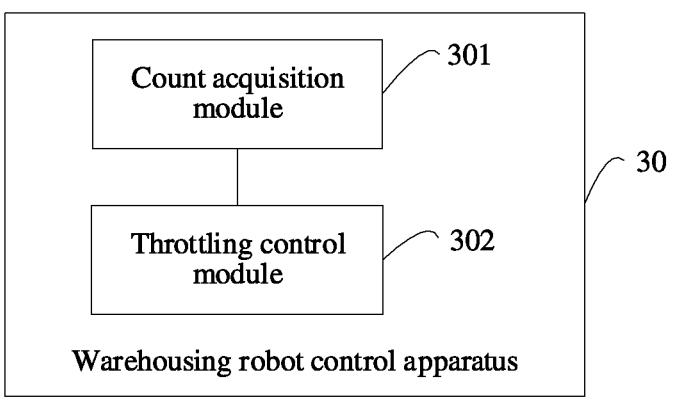
FIG. 7 is a schematic structural diagram of a warehousing robot control apparatus according to Embodiment 4 of the present disclosure.

FIG. 7 is a schematic structural diagram of a warehousing robot control apparatus according to Embodiment 4 of the present disclosure. The warehousing robot control apparatus provided in this embodiment of the present disclosure can perform the processing processes provided in the embodiments of the warehousing robot control method. As shown in FIG. 7, the warehousing robot control apparatus 30 includes: a count acquisition module 301 and a throttling control module 302.

Specifically, the count acquisition module 301 is configured to acquire the number of the robot in a preset area of a workstation; and the throttling control module 302 is configured to send an avoidance instruction to a warehousing robot that meets an avoidance condition when the number of the robot in the preset area meets a throttling condition, the avoidance instruction being used for indicating an operation of the warehousing robot stopping entering the preset area.

In an optional implementation, that the number of the robot in the preset area meets a throttling condition includes: the number of the robot in the preset area is greater than a first threshold.

In an optional implementation, the preset area includes at least one queuing position, and that the number of the robot in the preset area meets a throttling condition includes: the number of the robot in the preset area is equal to the number of the at least one queuing position in the preset area.

In an optional implementation, the preset area includes at least one queuing position, and that the number of the robot in the preset area meets a throttling condition includes: each of the at least one queuing position is occupied by a robot; or each of the at least one queuing position is occupied by a robot, and the number of the robot in the preset area is greater than a second threshold, the second threshold being greater than the number of the at least one queuing position.

In an optional implementation, the throttling control module 302 is further configured to:

send the avoidance instruction to a warehousing robot to which the workstation has been allocated and that has not entered the preset area; or send the avoidance instruction to a warehousing robot to which the workstation has been allocated and that has entered a first area and has not entered the preset area, the preset area being a part of the first area.

In an optional implementation, the avoidance instruction is configured to instruct the warehousing robot to get into an avoidance state and stand by in situ; or the avoidance instruction is configured to instruct the warehousing robot to get into an avoidance state, move to a waiting area, and then stand by.

In an optional implementation, the waiting area is an area other than the preset area; or the waiting area is an area other than the preset area and within a preset distance range of the workstation; or the waiting area is a specified avoidance area in an area other than a preset area of each workstation.

In an optional implementation, the throttling control module 302 is further configured to:

detect whether a warehousing robot in an avoidance state is located in the waiting area; and send, to a warehousing robot that is located out of the waiting area and that is in an avoidance state, an indication for entering the waiting area.

In an optional implementation, the avoidance instruction is further configured to set a priority of the warehousing robot that meets the avoidance condition to the lowest level.

In an optional implementation, the throttling control module 302 is further configured to:

allocate a queuing position in the preset area to the warehousing robot during allocation of the workstation to the warehousing robot.

In an optional implementation, the throttling control module 302 is further configured to:

when a first robot enters a preset range of the workstation, if at least one queuing position in a vacant state exists before a first queuing position allocated to the first robot, allocate a second queuing position in the at least one queuing position to the first robot, the first robot being any warehousing robot to which a queuing position of the workstation is allocated.

In an optional implementation, the second queuing position is the frontmost queuing position of the at least one queuing position in the vacant state.

In an optional implementation, the throttling control module 302 is further configured to:

after the second queuing position in the at least one queuing position is allocated to the first robot, update a queuing position of at least one second robot, the second robot being a robot to which a queuing position of the workstation has been allocated and that has not arrived at the corresponding queuing position.

In an optional implementation, the throttling control module 302 is further configured to:

before the second queuing position in the at least one queuing position is allocated to the first robot, determine a third robot corresponding to the second queuing position; and after the second queuing position in the at least one queuing position is allocated to the first robot, allocate the first queuing position to the third robot.

In an optional implementation, the throttling control module 302 is further configured to:

re-allocate a queuing position in a vacant state to each second robot according to a queuing position in a vacant state in the preset area, an order of a queuing position corresponding to the at least one second robot after the re-allocation being the same as an order of a queuing position corresponding to the at least one second robot before the re-allocation.

In an optional implementation, the throttling control module 302 is further configured to:

allocate a corresponding queuing position to the warehousing robot according to task attribute information of the warehousing robot, the task attribute information includes at least one of the following: a task allocation time, a task priority, and a remaining task time.

In an optional implementation, the throttling control module 302 is further configured to:

after the avoidance instruction is sent to the warehousing robot that meets the avoidance condition when the number of the robot in the preset area meets the throttling condition, if the number of the robot in the preset area does not meet the throttling condition, schedule a warehousing robot in an avoidance state to enter the preset area.

In an optional implementation, the throttling control module 302 is further configured to:

when a fourth robot in the preset area leaves the preset area, determine a corresponding number of fifth robots in an avoidance state according to the number of fourth robots, and schedule the fifth robot to enter the preset area.

In an optional implementation, the throttling control module 302 is further configured to:

when a warehousing robot in the first queuing position in the preset area leaves the first queuing position, schedule warehousing robots in the second and later queuing positions in the preset area to move from the current queuing positions to previous queuing positions.

In an optional implementation, the throttling control module 302 is further configured to:

after the warehousing robots in the second and later queuing positions in the preset area are scheduled to move from the current queuing positions to the previous queuing positions, determine a corresponding number of fifth robots in an avoidance state according to a queuing position currently in a vacant state in the preset area; and allocate the queuing position currently in the vacant state in the preset area to the fifth robot.

In an optional implementation, the throttling control module 302 is further configured to:

sort the warehousing robot in the avoidance state; and determine, according to an order of the warehousing robot getting into the avoidance state, a corresponding number of warehousing robots in the avoidance state as the fifth robot.

In an optional implementation, the throttling control module 302 is further configured to:

sort the warehousing robot in the avoidance state according to task attribute information of the warehousing robot in the avoidance state, the task attribute information including at least one of the following: a task allocation time, a task priority, and a remaining task time; or sort the warehousing robot in the avoidance state according to an order of entering the avoidance state; or sort the warehousing robot in the avoidance state according to an order of entering a waiting area; or sort the warehousing robot in the avoidance state according to an order of an allocated queuing position.

In an optional implementation, the warehousing robot includes a plurality of types of robots, the preset area includes at least one queue, each queue includes at least one queuing position, and the throttling control module 302 is further configured to:

during allocation of a queuing position in the preset area to the warehousing robot, allocate, to the warehousing robot according to a type of the warehousing robot, a queuing position in a queue corresponding to the type of the warehousing robot.

The apparatus provided in this embodiment of the present disclosure may be specifically configured to perform the method process performed by the scheduling server in any one of the foregoing method embodiments. Specific functions are not described in detail herein again.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to enter an avoidance state and stop moving toward a preset area of a workstation allocated to the warehousing robot. This can reduce the number of warehousing robots that wait near a workstation, thereby avoiding congestion near the workstation, and improving goods pick-and-place efficiency.

Embodiment 5

Figure 8:
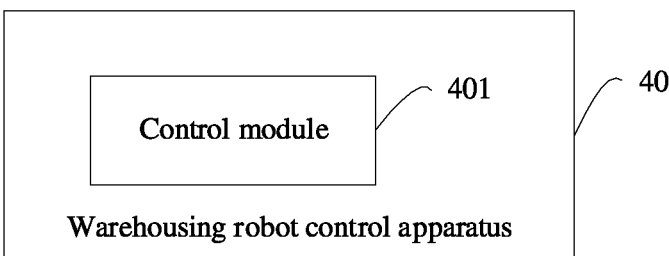
FIG. 8 is a schematic structural diagram of a warehousing robot control apparatus according to Embodiment 5 of the present disclosure.

FIG. 8 is a schematic structural diagram of a warehousing robot control apparatus according to Embodiment 5 of the present disclosure. As shown in FIG. 8, the warehousing robot control apparatus 40 includes: a control module 401, configured to enter an avoidance state and stop moving toward a preset area of a workstation allocated to the warehousing robot if an avoidance instruction is received, the avoidance instruction being used for: when the number of the robot in the preset area of the workstation meets a throttling condition, instructing a warehousing robot that meets an avoidance condition to enter an avoidance state and stop moving toward the preset area.

In an optional implementation, the preset area includes at least one queuing position, and the control module 401 is further configured to:

in response to an instruction for allocating a queuing position to the warehousing robot, move toward a queuing position allocated to the warehousing robot.

In an optional implementation, the control module 401 is further configured to:

get into an avoidance state and stand by in situ when an avoidance instruction is received; or enter an avoidance state, move to a waiting area, and then stand by if an avoidance instruction is received.

In an optional implementation, the control module 401 is further configured to:

after the getting into the avoidance state and stopping moving toward a preset area of a workstation allocated to the warehousing robot when an avoidance instruction is received, cancel the avoidance state and move toward the preset area in response to a scheduling instruction.

The apparatus provided in this embodiment of the present disclosure may be specifically configured to perform the method process performed by the warehousing robot in any one of the foregoing method embodiments. Specific functions are not described in detail herein again.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to enter an avoidance state and stop moving toward a preset area of a workstation allocated to the warehousing robot. This can reduce the number of warehousing robots that wait near a workstation, thereby avoiding congestion near the workstation, and improving goods pick-and-place efficiency.

Embodiment 6

Figure 9:
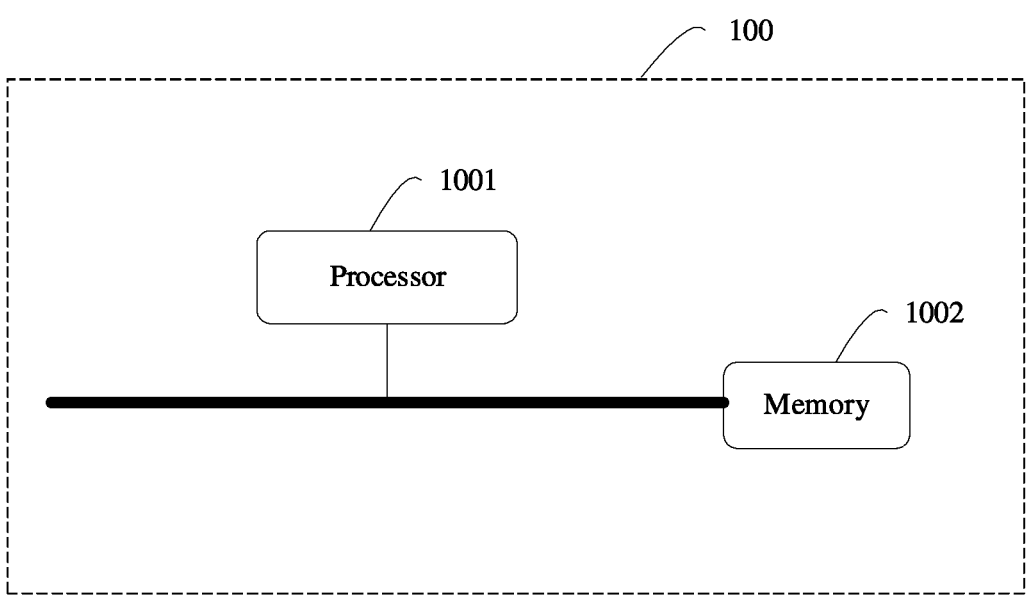
FIG. 9 is a schematic structural diagram of a scheduling server according to Embodiment 6 of the present disclosure.

FIG. 9 is a schematic structural diagram of a scheduling server according to Embodiment 6 of the present disclosure. The scheduling server is applied to an intelligent warehousing system. As shown in FIG. 9, the scheduling server 100 includes: a processor 1001, a memory 1002, and a computer program stored in the memory 1002 and capable of running on the processor 1001, the processing process performed by the scheduling server in any one of the foregoing method embodiments being implemented when the processor 1001 runs the computer program.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to enter an avoidance state and stop moving toward a preset area of a workstation allocated to the warehousing robot. This can reduce the number of warehousing robots that wait near a workstation, thereby avoiding congestion near the workstation, and improving goods pick-and-place efficiency.

Embodiment 7

Figure 10:
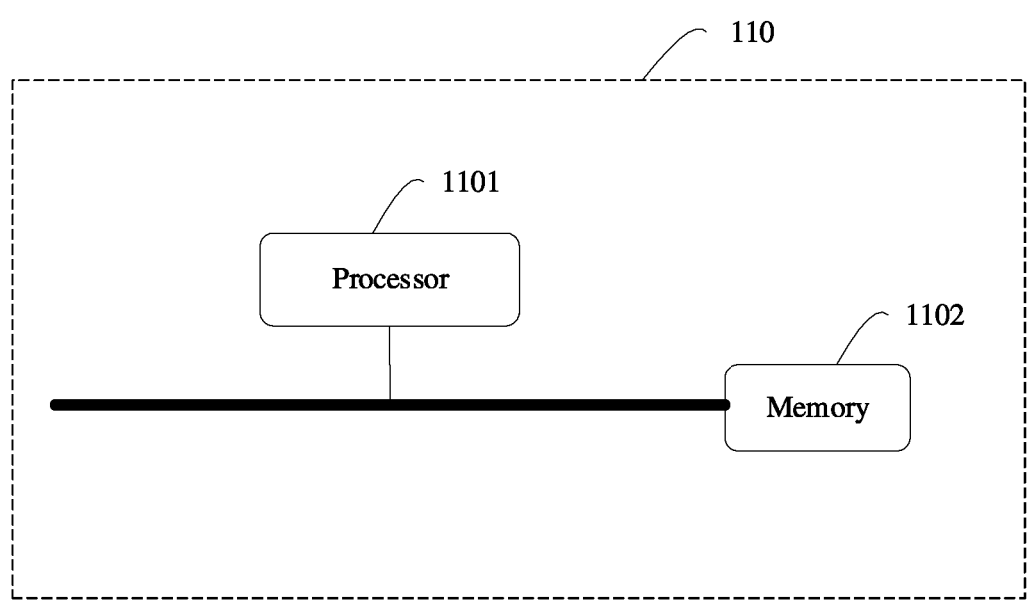
FIG. 10 is a schematic structural diagram of a warehousing robot according to Embodiment 6 of the present disclosure.

FIG. 10 is a schematic structural diagram of a warehousing robot according to Embodiment 6 of the present disclosure. The warehousing robot is applied to an intelligent warehousing system. As shown in FIG. 10, the warehousing robot 110 includes: a processor 1101, a memory 1102, and a computer program stored in the memory 1102 and capable of running on the processor 1101, the method process performed by the warehousing robot in any one of the foregoing method embodiments being implemented when the processor 1101 runs the computer program.

In this embodiment of the present disclosure, a preset area is arranged near a workstation, and a throttling condition corresponding to the preset area is set. When the number of the robot in the preset area meets the throttling condition, an avoidance instruction is sent to a warehousing robot that meets an avoidance condition, to control the warehousing robot that meets the avoidance condition to enter an avoidance state and stop moving toward a preset area of a workstation allocated to the warehousing robot. This can reduce the number of warehousing robots that wait near a workstation, thereby avoiding congestion near the workstation, and improving goods pick-and-place efficiency.

In addition, an embodiment of the present disclosure further provides a computer-readable storage medium, the computer-readable storage medium storing a computer program, and the method process performed by the scheduling server or the warehousing robot in any one of the foregoing method embodiments being implemented when the computer program is executed by a processor.

A person skilled in the art can clearly understand that, for convenience and conciseness of description, the apparatus is illustrated with an example of division of the foregoing function modules. In actual application, the foregoing functions may be allocated to and completed by different function modules according to requirements, that is, the internal structure of the apparatus is divided into different function modules, so as to complete all or part of the functions described above. For specific working processes of the foregoing apparatuses, reference may be made to the corresponding processes in the foregoing method embodiments, and details are not described herein again.

After considering the specification and practicing the present disclosure, a person skilled in the art can easily conceive of other implementations of the present disclosure. The present disclosure is intended to cover any variations, functions, or adaptive changes of the present disclosure. These variations, functions, or adaptive changes comply with general principles of the present disclosure, and include common general knowledge or common technical means in the technical field that are not disclosed in the present disclosure. The specification and embodiments are merely considered to be exemplary, and the actual scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A warehousing robot control method, executed by a scheduling server of an intelligent warehousing system, the method comprising:

acquiring the number of a warehousing robot in a preset area of a workstation; and sending an avoidance instruction to a warehousing robot that meets an avoidance condition when the number of the robot in the preset area meets a throttling condition, the avoidance instruction being used for indicating an operation of the warehousing robot stopping entering the preset area;

wherein after the sending an avoidance instruction to a warehousing robot that meets an avoidance condition when the number of the robot in the preset area meets a throttling condition, the method further comprises:

scheduling a warehousing robot in an avoidance state to enter the preset area when the number of the warehousing robot in the preset area does not meet the throttling condition;

wherein the scheduling a warehousing robot in an avoidance state to enter the preset area when the number of the warehousing robot in the preset area does not meet the throttling condition comprises:

when a fourth robot in the preset area leaves the preset area, determining a corresponding number of a fifth robot in the avoidance state according to the number of the fourth robot, and scheduling the fifth robot to enter the preset area; or when a warehousing robot in a first queuing position in the preset area leaves the first queuing position, scheduling warehousing robots in the second and later queuing positions in the preset area to move from the current queuing positions to previous queuing positions;

wherein the determining a corresponding number of a fifth robot in the avoidance state comprises:

sorting the warehousing robot in the avoidance state; and determining, according to an order of the warehousing robot getting into the avoidance state, the corresponding number of warehousing robot in the avoidance state as the fifth robot.

2. The method according to claim 1, wherein that the number of a warehousing robot in the preset area meets a throttling condition comprises:

the number of the warehousing robot in the preset area is greater than a first threshold; or wherein the preset area comprises at least one queuing position, and that the number of the warehousing robot in the preset area meets a throttling condition comprises: the number of the robot in the preset area is equal to the number of the at least one queuing position in the preset area; or wherein the preset area comprises at least one queuing position, and that the number of the warehousing robot in the preset area meets a throttling condition comprises: each of the at least one queuing position is occupied by a warehousing robot; or each of the at least one queuing position is occupied by a warehousing robot, and the number of the warehousing robot in the preset area is greater than a second threshold, the second threshold being greater than the number of the at least one queuing position.

3. The method according to claim 1, wherein the sending an avoidance instruction to a warehousing robot that meets an avoidance condition comprises:

sending the avoidance instruction to a warehousing robot to which the workstation has been allocated and that has not entered the preset area; or sending the avoidance instruction to a warehousing robot to which the workstation has been allocated and that has entered a first area and has not entered the preset area, the preset area being a part of the first area.

4. The method according to claim 1, wherein the avoidance instruction is configured to instruct the warehousing robot to get into an avoidance state and stand by in situ; or the avoidance instruction is configured to instruct the warehousing robot to get into an avoidance state, move to a waiting area, and then stand by;

wherein avoidance state indicates that when the warehousing robot in the avoidance state encounters a warehousing robot that is not in the avoidance state, the warehousing robot in the avoidance state gives way to the warehousing robot that is not in the avoidance state.

5. The method according to claim 4, wherein the waiting area is an area other than the preset area; or the waiting area is an area other than the preset area and within a preset distance range of the workstation; or the waiting area is a specified avoidance area in an area other than a preset area of each workstation.

6. The method according to claim 4, wherein after the sending an avoidance instruction to a warehousing robot that meets an avoidance condition, the method further comprises:

detecting whether a warehousing robot in an avoidance state is located in the waiting area; and sending, to a warehousing robot that is located out of the waiting area and that is in an avoidance state, an indication for entering the waiting area.

7. The method according to claim 4, wherein the avoidance instruction is further configured to set a priority of the warehousing robot that meets the avoidance condition to the lowest level.

8. The method according to claim 2, further comprising:

allocating a queuing position in the preset area to the warehousing robot during allocation of the workstation to the warehousing robot;

when a first robot enters a preset range of the workstation, if at least one queuing position in a vacant state exists before a first queuing position allocated to the first robot, allocating a second queuing position in the at least one queuing position to the first robot, the first robot being any warehousing robot to which a queuing position of the workstation is allocated;

wherein the second queuing position is the frontmost queuing position of the at least one queuing position in the vacant state.

9. The method according to claim 8, wherein after the allocating a second queuing position in the at least one queuing position to the first robot, the method further comprises:

updating a queuing position of at least one second robot, each of the at least one second robot being a robot to which a queuing position of the workstation has been allocated and that has not arrived at a corresponding queuing position;

the method further comprising:

determining a third robot corresponding to the second queuing position; and wherein the updating a queuing position of at least one second robot comprises:

allocating the first queuing position to the third robot; or re-allocating a queuing position in a vacant state to each second robot according to a queuing position in a vacant state in the preset area, an order of a queuing position corresponding to the at least one second robot after the re-allocation being the same as an order of a queuing position corresponding to the at least one second robot before the re-allocation.

10. The method according to claim 8, wherein the allocating a queuing position in the preset area to the warehousing robot comprises:

allocating a corresponding queuing position to the warehousing robot according to task attribute information of the warehousing robot, the task attribute information comprising at least one of the following: a task allocation time, a task priority, and a remaining task time.

11. The method according to claim 1, wherein after the scheduling warehousing robots in the second and later queuing positions in the preset area to move from the current queuing positions to previous queuing positions, the method further comprises:

determining a corresponding number of a fifth robot in the avoidance state according to the number of the queuing position currently in a vacant state in the preset area; and allocating the queuing position currently in the vacant state in the preset area to the fifth robot.

12. The method according to claim 1, wherein the sorting the warehousing robot in the avoidance state comprises:

sorting the warehousing robot in the avoidance state according to task attribute information of the warehousing robot in the avoidance state, the task attribute information comprising at least one of the following: a task allocation time, a task priority, and a remaining task time; or sorting the warehousing robot in the avoidance state according to an order of entering the avoidance state; or sorting the warehousing robot in the avoidance state according to an order of entering a waiting area; or sorting the warehousing robot in the avoidance state according to an order of an allocated queuing position.

13. The method according to claim 1, wherein before the acquiring the number of a warehousing robot in a preset area of a workstation, the method further comprises: acquiring a real-time position of each warehousing robot, and determining the number of the warehousing robot in a preset area of each workstation according to the real-time position of each warehousing robot and a position of the preset area of each workstation.

14. A warehousing robot control method, executed by a warehousing robot, the method comprising:

getting into an avoidance state and stopping moving toward a preset area of a workstation allocated to the warehousing robot when an avoidance instruction is received, the avoidance instruction being configured to: when the number of the warehousing robot in the preset area of the workstation meets a throttling condition, instruct a warehousing robot that meets an avoidance condition to get into the avoidance state and stop moving toward the preset area;

entering the preset area when the number of the warehousing robot in the preset area does not meet the throttling condition;

wherein entering the preset area when the number of the warehousing robot in the preset area does not meet the throttling condition comprises: when a fourth robot in the preset area leaves the preset area, a corresponding number of a fifth robot in the avoidance state entering the preset area;

wherein the corresponding number of a fifth robot is determined according to the number of the fourth robot; and wherein the corresponding number of a fifth robot is determined by sorting the warehousing robot in the avoidance state; and determining, according to an order of the warehousing robot getting into the avoidance state, the corresponding number of warehousing robot in the avoidance state as the fifth robot.

15. The method according to claim 14, wherein the getting into an avoidance state and stopping moving toward a preset area of a workstation allocated to the warehousing robot when an avoidance instruction is received comprises:

getting into the avoidance state and standing by in situ when the avoidance instruction is received; or getting into the avoidance state, moving to a waiting area, and then standing by when the avoidance instruction is received.

16. A scheduling server, comprising:

a processor, a memory, and a computer program stored in the memory and capable of running on the processor, wherein when running the computer program, the processor is configured to implement the operation of:

acquiring the number of a warehousing robot in a preset area of a workstation; and sending an avoidance instruction to a warehousing robot that meets an avoidance condition when the number of the robot in the preset area meets a throttling condition, the avoidance instruction being used for indicating an operation of the warehousing robot stopping entering the preset area;

wherein after the sending an avoidance instruction to a warehousing robot that meets an avoidance condition when the number of the robot in the preset area meets a throttling condition, the method further comprises:

scheduling a warehousing robot in an avoidance state to enter the preset area when the number of the warehousing robot in the preset area does not meet the throttling condition;

wherein the scheduling a warehousing robot in an avoidance state to enter the preset area when the number of the warehousing robot in the preset area does not meet the throttling condition comprises:

when a fourth robot in the preset area leaves the preset area, determining a corresponding number of a fifth robot in the avoidance state according to the number of the fourth robot, and scheduling the fifth robot to enter the preset area; or when a warehousing robot in a first queuing position in the preset area leaves the first queuing position, scheduling warehousing robots in the second and later queuing positions in the preset area to move from the current queuing positions to previous queuing positions;

wherein the determining a corresponding number of a fifth robot in the avoidance state comprises:

sorting the warehousing robot in the avoidance state; and determining, according to an order of the warehousing robot getting into the avoidance state, the corresponding number of warehousing robot in the avoidance state as the fifth robot.

17. A warehousing robot, comprising:

a processor, a memory, and a computer program stored in the memory and capable of running on the processor, wherein when running the computer program, the processor is configured to implement the operation of:

getting into an avoidance state and stopping moving toward a preset area of a workstation allocated to the warehousing robot when an avoidance instruction is received, the avoidance instruction being configured to: when the number of the warehousing robot in the preset area of the workstation meets a throttling condition, instruct a warehousing robot that meets an avoidance condition to get into the avoidance state and stop moving toward the preset area;

entering the preset area when the number of the warehousing robot in the preset area does not meet the throttling condition;

wherein entering the preset area when the number of the warehousing robot in the preset area does not meet the throttling condition comprises: when a fourth robot in the preset area leaves the preset area, a corresponding number of a fifth robot in the avoidance state entering the preset area;

wherein the corresponding number of a fifth robot is determined according to the number of the fourth robot; and wherein the corresponding number of a fifth robot is determined by sorting the warehousing robot in the avoidance state; and determining, according to an order of the warehousing robot getting into the avoidance state, the corresponding number of warehousing robot in the avoidance state as the fifth robot.

18. A non-transitory computer-readable storage medium, storing a computer program, and the computer program, when executed by a processor, cause the processor to:

acquire the number of a warehousing robot in a preset area of a workstation;

and send an avoidance instruction to a warehousing robot that meets an avoidance condition when the number of the robot in the preset area meets a throttling condition, the avoidance instruction being used for indicating an operation of the warehousing robot stopping entering the preset area;

wherein after the avoidance instruction is sent to the warehousing robot that meets the avoidance condition when the number of the robot in the preset area meets the throttling condition, the processor is caused to: schedule a warehousing robot in an avoidance state to enter the preset area when the number of the warehousing robot in the preset area does not meet the throttling condition;

wherein when the processor is caused to schedule a warehousing robot in an avoidance state to enter the preset area when the number of the warehousing robot in the preset area does not meet the throttling condition, the processor is caused to: when a fourth robot in the preset area leaves the preset area, determine a corresponding number of a fifth robot in the avoidance state according to the number of the fourth robot, and schedule the fifth robot to enter the preset area;

wherein when the processor is caused to determine a corresponding number of a fifth robot in the avoidance state, the processor is caused to: sort the warehousing robot in the avoidance state; and determine, according to an order of the warehousing robot getting into the avoidance state, the corresponding number of warehousing robot in the avoidance state as the fifth robot.

* * * * *